(12) United States Patent
Kessels et al.

(10) Patent No.: US 7,858,409 B2
(45) Date of Patent: Dec. 28, 2010

(54) WHITE POINT COMPENSATED LEDS FOR LCD DISPLAYS

(75) Inventors: Marcus J. H. Kessels, Susteren (NL); Willem Sillevis Smitt, San Jose, CA (US); Gerd Mueller, San Jose, CA (US); Serge Bierhuizen, Santa Rosa, CA (US)

(73) Assignees: Koninklijke Philips Electronics N.V., Eindhoven (NL); Philips Lumileds Lighting Company, LLC, San Jose, CA (US)

( * ) Notice: Subject to any disclaimer, the term of this patent is extended or adjusted under 35 U.S.C. 154(b) by 190 days.

(21) Appl. No.: 12/212,991

(22) Filed: Sep. 18, 2008

(65) Prior Publication Data

US 2010/0065864 A1  Mar. 18, 2010

(51) Int. Cl.
*H01L 21/00* (2006.01)
*H01L 29/02* (2006.01)

(52) U.S. Cl. ............... 438/29; 438/30; 257/89; 257/E21.001; 257/E33.001

(58) Field of Classification Search ............. 438/29, 438/30; 257/89, E21.001, E33.001
See application file for complete search history.

(56) References Cited

U.S. PATENT DOCUMENTS 6,274,399 B1 * 8/2001 Kern et al. ............... 438/22
6,649,440 B1 * 11/2003 Krames et al. ............ 438/47
7,352,011 B2 * 4/2008 Smits et al. ............... 257/99
7,452,737 B2 * 11/2008 Basin et al. ............... 438/27
2005/0269582 A1 * 12/2005 Mueller et al. ............ 257/94
2007/0096131 A1   5/2007 Chandra
2007/0215890 A1   9/2007 Harbers et al.
2008/0036364 A1   2/2008 Li et al.
2008/0048200 A1 * 2/2008 Mueller et al. ........... 257/98
2008/0315228 A1 * 12/2008 Krames et al. ........... 257/98
2009/0128460 A1   5/2009 Roberts et al.
2009/0129074 A1   5/2009 Roberts et al.

FOREIGN PATENT DOCUMENTS

WO   2009064361 A1   5/2009
WO   2009064363 A1   5/2009

* cited by examiner

*Primary Examiner*—Lex Malsawma (57) ABSTRACT

A backlight for a color LCD includes white light LEDs formed using a blue LED die with a layer of red and green phosphors over it. The attenuation by the LCD layers of the blue light component of the white light is typically greater as the blue wavelength becomes shorter. In order to achieve a uniform blue color component across the surface of an LCD screen and achieve uniform light output from one LCD to another, the blue light leakage of the phosphor layer is tailored to the dominant or peak wavelength of the blue LED die. Therefore, the white points of the various white light LEDs in a backlight should not match when blue LED dies having different dominant or peak wavelengths are used in the backlight. The different leakage amounts through the tailored phosphor layers offset the attenuation vs. wavelength of the LCD layers.

15 Claims, 6 Drawing Sheets

WHITE POINT COMPENSATED LEDS FOR LCD DISPLAYS

FIELD OF THE INVENTION

This invention relates to backlights for liquid crystal displays (LCDs) and, in particular, to LCD backlights using white-light light emitting diodes (LEDs).

BACKGROUND

Figure 1:
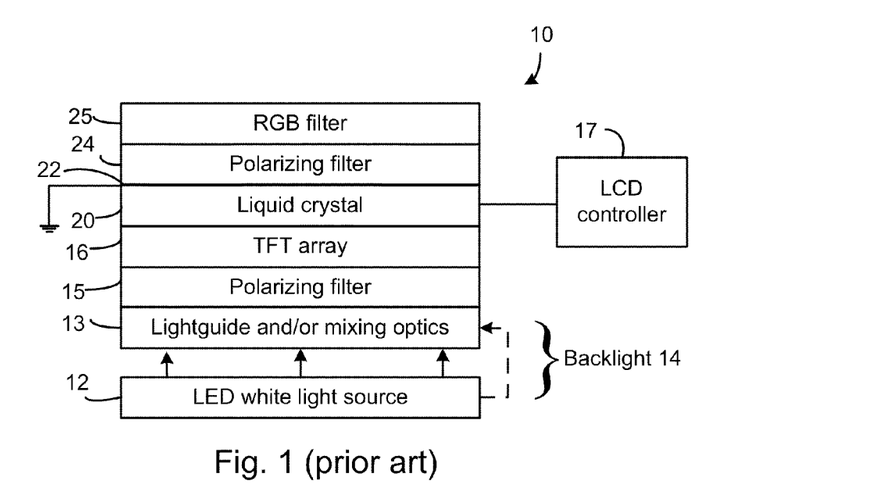
FIG. 1 is a schematic view of a conventional LCD with an LED white light backlight.

FIG. 1 illustrates one type of prior art color, transmissive LCD.

In FIG. 1, an LCD 10 includes an LED white light source 12 to provide backlighting for the upper LCD layers. The LED white light source 12 has certain advantages over using a traditional fluorescent bulb, such as size, reliability, and avoiding the use of a high voltage power supply.

For other than very small displays, there are typically multiple white light LEDs used in a backlight to more uniformly distribute the light to the bottom of the LCD layers and supply the required brightness level. For small and medium LCD backlights, the white light LEDs may be optically coupled to one or more edges of a transparent lightguide that uniformly leaks light out its top surface. Light from multiple LEDs somewhat mixes within the lightguide. For medium and large LCD backlights, an array of the white light LEDs may be positioned on the bottom surface of a light mixing box. A diffuser, a brightness enhancement film (BEF), and a dual brightness enhancement film (DBEF) are positioned over the lightguide or box opening to smooth and direct the light for illuminating the LCD layers. Designers have strived to make all of the backlight white light LEDs output the same target white point so that the backlight outputs a uniform white point across the surface of the backlight.

The layer 13 in FIG. 1 represents the edge-lit lightguide and/or any mixing optics (mixing box, diffuser, BEF, DBEF, etc.) used for the particular application. The combination of the light source 12 and lightguide/mixing optics (layer 13) is referred to as a backlight 14.

A polarizing filter 15 linearly polarizes the white light. The polarized white light is then transmitted to a transparent thin film transistor (TFT) array 16, having one transistor for each red, green, and blue subpixel in the display. A set of closely spaced red, green, and blue subpixels is referred to as a white pixel whose color "dot" is a combination of the three subpixels. If the RGB subpixels are all energized, the dot creates white light. TFT arrays are well known. The TFT array is controlled by an LCD controller 17.

Above the TFT array 16 is a liquid crystal layer 20, and above liquid crystal layer 20 is a transparent conductive layer 22 connected to ground. In one type of LCD, an electrical field across a subpixel area of the liquid crystal layer 20 causes light passing through that subpixel area to have its polarization rotated orthogonal to the incoming polarization. The absence of an electrical field across a subpixel area of the liquid crystal layer 20 causes the liquid crystals to align and not affect the polarization of light. Selectively energizing the transistors controls the local electric fields across the liquid crystal layer 20. Each portion of the liquid crystal layer associated with a subpixel is commonly referred to as a shutter, since each shutter is controllable to pass from 0-100% (assuming a lossless system) of the incoming light to the output of the display. Liquid crystal layers are well known and commercially available.

A polarizing filter 24 only passes polarized light orthogonal to the light output from the polarizing filter 15. Therefore, the polarizing filter 24 only passes light that has been polarized by an energized subpixel area in the liquid crystal layer 20 and absorbs all light that passes through non-energized portions of the liquid crystal layer 20. The magnitudes of the electric fields across the liquid crystal layer 20 control the brightness of the individual R, G, and B components to create any color for each pixel in the displayed image.

Other types of LCDs pass light through only the non-energized pixels. Other LCDs use different orientation polarizers. Some types of LCDs substitute a passive conductor grid for the TFT array 16, where energizing a particular row conductor and column conductor energizes a pixel area of the liquid crystal layer at the cross-point.

The light passing through the polarizing filter 24 is then filtered by an RGB pixel filter 25. The RGB pixel filter 25 can be located at other positions in the stack, such as anywhere below or above the liquid crystal layer 20. The RGB pixel filter 25 may be comprised of a red filter layer, a green filter layer, and a blue filter layer. The layers may be deposited as thin films. As an example, the red filter layer contains an array of red light filter areas defining the red subpixel areas of the display. Similarly, the green and blue filter layers only allow green or blue light to pass in the areas of the green and blue subpixels. Accordingly, the RGB pixel filter 25 provides a filter for each R, G, and B subpixel in the display.

The RGB pixel filter 25 inherently filters out at least two-thirds of all light reaching it, since each filter subpixel area only allows one of the three primary colors to pass. This is a significant factor in the generally poor efficiency of the prior art LCDs. The overall transmissivity of the LCD layers above the backlight 14 is on the order of 4-10%.

Figure 2:
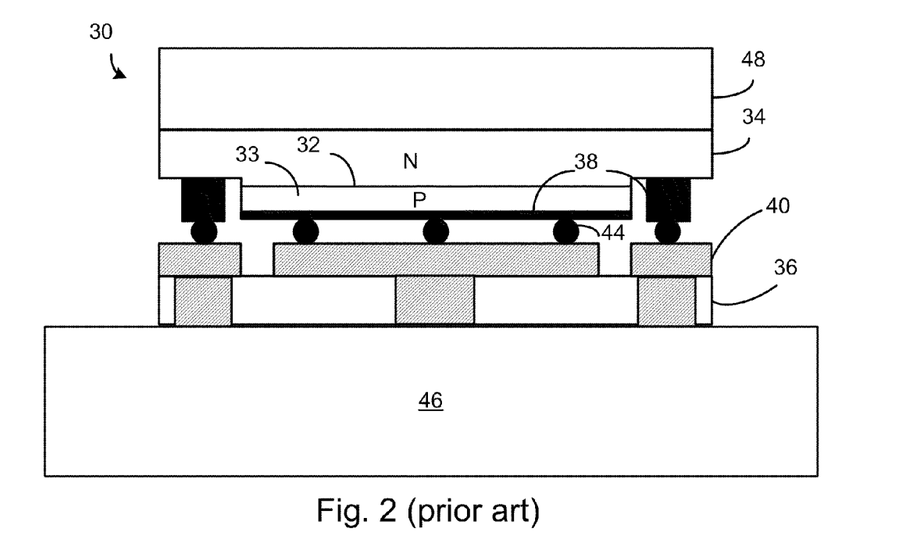
FIG. 2 is a cross-sectional view of one type of white light LED using a blue LED die and a layer of phosphor to add red and green light components.

One type of white light LED 30 is shown in FIG. 2. The LED 30 comprises a flip-chip LED die formed of a semiconductor light emitting active layer 32 between a p-type layer 33 and an n-type layer 34. Optionally, the growth substrate (e.g., sapphire) is removed. The LED die emits blue light. Typical materials for the LED die are GaN and SiC. Examples of forming such LEDs are described in U.S. Pat. Nos. 6,649,440 and 6,274,399, both assigned to Philips Lumileds Lighting and incorporated by reference.

The LED die is mounted on a submount 36 formed of any suitable material, such as a ceramic or silicon. The LED die has bottom metal contacts 38 that are bonded to associated metal pads 40 on submount 36 via gold balls 44. Vias through submount 36 terminate in metal pads on the bottom surface of submount 36, which are bonded to metal leads on a circuit board 46. The metal leads are connected to other LEDs or to a power supply.

Since the LED die only emits blue light, red and green light components must be added to create white light. Such red and green components are provided by a phosphor layer 48 that contains red and green phosphors or contains a yellow-green phosphor (e.g., YAG). The phosphor layer 48 may also cover the sides of the LED die. There are many known ways of providing a phosphor layer over a blue die to create white light.

The phosphor layer 48 allows a percentage of the blue LED light to leak out. Some of the blue light is absorbed by the phosphor and reemitted as red and green light (or yellow-green light). The combination of the blue light and phosphor emission creates white light. A target white point is achieved by selecting the densities of the phosphor particles in the layer, the relative amounts of the phosphors, and the thickness of the phosphor layer.

Even though blue LEDs from a manufacturer may be fabricated using the same repeated procedures, the dominant wavelengths of blue LEDs vary from batch to batch and even within a single batch. When the dominant wavelength is important for particular applications, manufacturers energize the blue LEDs and measure their dominant wavelengths, then bin the LEDs according to their dominant wavelengths. The dominant wavelengths may differ by 40 nm, and each bin may typically include LEDs within a 5-8 nm range (i.e., 2.5-4 nm variation from the bin's center wavelength). A typical range of dominant wavelengths for blue LEDs used as LCD backlights is 420-460 nm.

Heretofore, designers of backlights have strived to make the white points of all backlight LEDs the same, so that the human eye will perceive the same white light being emanated across the backlight surface and from one backlight to another. This may be done by precisely matching the blue LED dies and precisely replicating the phosphor layer characteristics for each die. This is wasteful of those LED dies that do not match the target dominant wavelength. Alternatively, the phosphor layer characteristics can be tailored for each blue LED bin so that the resulting white point for each LED matches a single target white point. All such white light will appear identical to the human eye.

The present inventors have measured the light attenuation by LCD layers versus wavelength and have determined that the attenuation varies with wavelengths within the visible range. The variation within the blue wavelength range is by far the greatest. The attenuation is due to the combined attenuation by the polarizers, the ITO electrode (the transparent grounded layer), the liquid crystal layer, and the RGB filters. There is also non-flat attenuation by the lightguide (if used), the diffuser (if used), and BEFs (if used).

The inventors have discovered that, because of the varying light attenuation by LCD layers versus wavelength, even though the white points of the backlight LEDs are matched by tailoring the phosphor characteristics for each bin of blue LEDs, the measured color output by the LCD is not consistent across the surface of the LCD, such as when all pixels are turned fully on to create a solid white light display.

Therefore, what is needed is an LED backlight that results in the color output of an LCD to be consistent across the surface of the LCD and from one LCD to another.

SUMMARY

The attenuation of light by the LCD layers in the blue wavelength band is greater as the blue wavelength becomes shorter. The inventors have discovered that, in order to achieve a uniform blue color component across the surface of an LCD screen, the white points (correlated color temperatures) of all the various white light LEDs should not match when the blue LED die dominant wavelengths are different. This goes against the conventional LED backlight design goal.

To offset the attenuation vs. wavelength of the LCD layers, blue LED dies that emit a relatively short dominant wavelength of blue light have their phosphor layer tailored to let more blue light leak through, compared to phosphor layers for blue LED dies that emit a longer dominant wavelength of blue light. In other words, since the LCD attenuates the shorter blue wavelengths more than the longer blue wavelengths, more of the shorter wavelength blue light must be leaked out through the phosphor layer in order for the blue output of the LCD to be the same whether the LCD is backlit using short wavelength blue LEDs or long wavelength blue LEDs. The amount of the blue light applied to the back of the LCD is only affected by the leakage through the phosphor.

Although the dominant wavelengths are used to characterize the blue LEDs in the examples, the peak wavelengths may be used instead.

To obtain different amounts of blue light leakage through the phosphor layer for the different bins, the thickness of the phosphor layer is tailored and/or the density of the phosphor particles is tailored. To a lesser extent, the relative percentages of the red and green phosphors may be adjusted to account for the different excitement energies of the LED die.

The phosphor layer still must supply the red and green light components of the white light to result in a uniform red and green light output from the LCD. Since the attenuation by the LCD of red and green light does not significantly vary with the wavelength, the magnitudes of the red and green light components of the white light LED may be consistent for all the LEDs.

Since the various white light LEDs used for the backlight will emit substantially identical red and green light components but emit various brightness levels of blue light, depending on the dominant wavelength of each LED die, the white points of the various LEDs will be different, making the backlight output appear non-uniform across its surface if the backlight used blue LEDs from different bins. This is especially apparent in areas of the backlight where the light from the various LEDs have not thoroughly mixed. The white light LEDs outputting a shorter dominant blue wavelength will appear bluer than the white light LEDs outputting a longer dominant blue wavelength.

If each backlight were only populated with white light LEDs using all blue LED dies from the same bin, then the white point across the entire backlight will be substantially uniform. The benefit of the invention in that case is that the output color of LCDs will be consistent from one LCD to the other no matter which bin of LEDs was used to populate the backlights.

This control of the white points of the LEDs for the backlight is applicable to backlights where the white light LEDs are coupled to the edge of a lightguide and to those backlights where the LEDs are distributed directly behind the LCD layers.

In one embodiment, the phosphor for a particular blue LED die is formed over the die by compression molding the phosphor over the die. This is done by suspending phosphor powder in a liquid binder, such as high index silicone, then dispensing the phosphor/binder into indentations of a mold. Blue LEDs mounted on a submount wafer are then brought against the mold so that each blue LED is immersed in the phosphor/binder material within an indentation. The phosphor/binder is then cured, and the submount wafer is then separated from the mold. Preferably all the blue LEDs populating the wafer are selected from the same bin so that the phosphor/binder and/or mold indentations are identical for all the LED dies.

In another embodiment, phosphor plates affixed to the top of the LED dies are tailored based on the LED bin.

A clear lens may be molded over the die/phosphor to improve light extraction and protect the LED.

BRIEF DESCRIPTION OF THE DRAWINGS

Elements that are the same or equivalent are labeled with the same numeral.

DETAILED DESCRIPTION

The present invention may use conventional blue LED dies, such as AlInGaN blue LEDs manufactured by the present assignee. A flip-chip LED die is used in the examples herein for simplicity. The blue LED die may be the same as shown in FIG. 2, with the growth substrate removed.

Examples of forming LEDs are described in U.S. Pat. Nos. 6,649,440 and 6,274,399, both assigned to Philips Lumileds Lighting and incorporated by reference.

Blue LEDs for use in backlights for LCDs are intended to have a dominant wavelength of approximately 440 nm. However, due to the inherent nature of LED fabrication processes, the dominant wavelengths typically range between about 420-460 nm. The blue LED dies are energized and tested by a measuring device to determine the dominant wavelength of each LED. The dies are then binned, either physically or by storing the location of the LED die on the wafer in a memory after testing. Each bin may only include dies having a dominant wavelength within about 2-4 nm of a bin's designated dominant wavelength.

The term "dominant wavelength" refers to the single wavelength that is perceived by the human eye, and is defined as the wavelength of monochromatic light that has the same apparent color as the light source. If the color of a single wavelength ("X" nm) is indistinguishable from the color of a given LED, then that LED has a dominant wavelength of "X".

Another way of binning blue LEDs is to measure their peak wavelength. The peak wavelength is defined as the single wavelength where the radiometric emission spectrum of the light source reaches its maximum. It does not represent the perceived emission of the light source by the human eye. Accordingly, either the dominant wavelength or the peak wavelength may be used to bin the blue LEDs, although the dominant wavelength will be used in the examples.

The attenuation vs. wavelength characteristics of a particular LCD for use with a white LED backlight are determined by supplying a wide spectrum light source to the back of the LCD layers and then measuring the light output from the LCD at different wavelengths.

Figure 3:
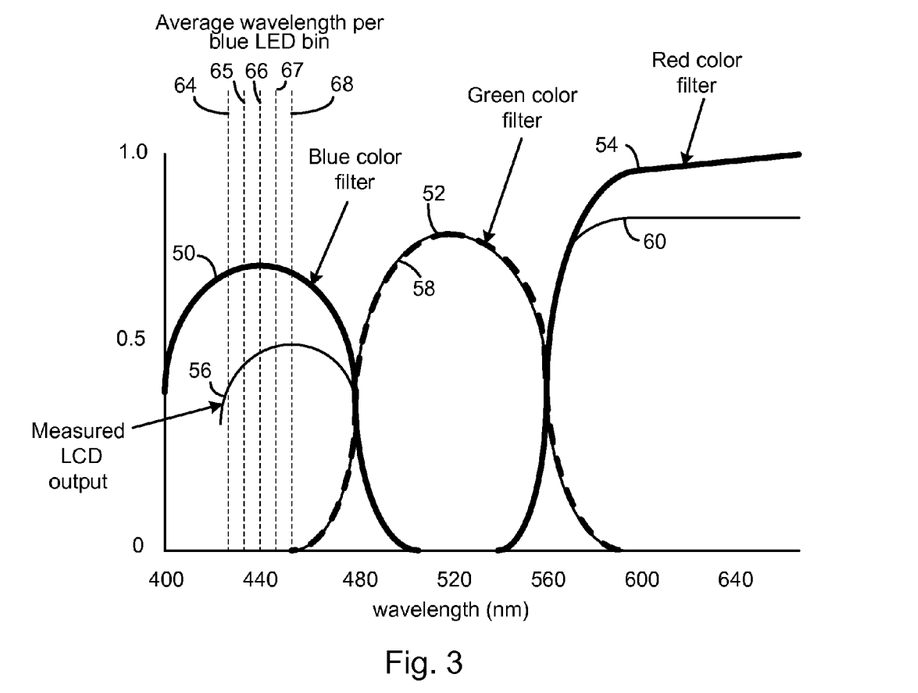
FIG. 3 is a graph of the RGB filter characteristics in a conventional LCD along with the measured blue, green, and red light output of the LCD, showing that the measured light output does not match the RGB filter characteristics, and showing that shorter wavelength blue light is attenuated more than longer wavelength blue light.

FIG. 3 is a simplified depiction of the light attenuation characteristics of the RGB color filters (bold lines) in a particular LCD. While the relative filter characteristics are preserved, the magnitudes are normalized so that the peak red output of the red filter is set to 1.0. Ideally, the filters would provide a constant attenuation across a narrow band and then rapidly fall off. However, in an actual LCD, the filter characteristics are very wavelength dependent.

As seen from the graph, the blue filter line 50 provides the least attenuation of blue light at the wavelength of 440 nm, the dashed green filter line 52 provides the least attenuation of green light at the wavelength of 520 nm, and the red filter line 54 is substantially flat. Ideally, the amount of blue light through the blue filter is constant over the entire range of the blue LED dies' dominant wavelengths; however, that is not the case.

Figure 4:
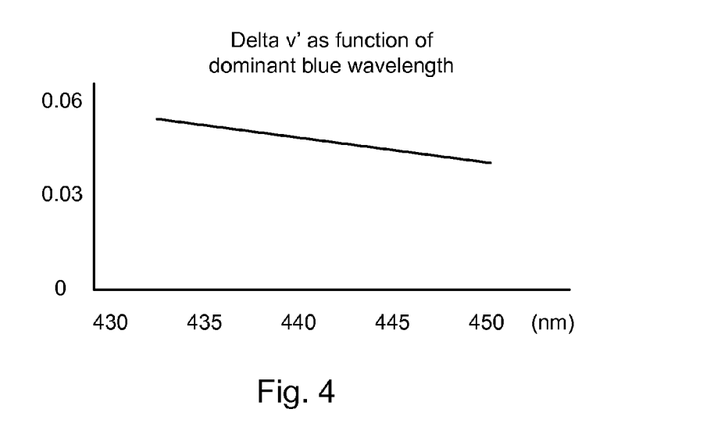
FIG. 4 is a graph of the change in the v' component in a standard CIE u'v' chromaticity chart vs. blue wavelength.

FIG. 4 illustrates the characteristics of the LCD attenuation over the blue light range, which is consistent with FIG. 3. In FIG. 4, the change in v' from the light color applied to the LCD to the light color output from the LCD is plotted over wavelength for a particular LCD, where v' is the y-axis value on a standard CIE chromaticity diagram. The standard CIE diagram shows the corresponding colors at the intersections of u' and v' values. Ideally, the v' change caused by the LCD layers would be flat across all wavelengths. The greater change in the v' value at the shorter blue wavelengths correlates to a greater attenuation by the LCD and an "upward" shift in the color on the CIE chromaticity diagram away from blue.

Referring back to FIG. 3, the measured LCD light output for each wavelength is shown by the narrower lines 56, 58, and 60. This measurement may be performed by backlighting the LCD layers with a broad spectrum light source, fully turning on only the pixels of a single color (red, green, or blue), and then using optical measuring equipment to measure the light brightness vs. wavelength for that single color. The green light output line 58 is scaled to the green filter line 52, but the relative magnitudes of the blue light output line 56, the green light output line 58, and the red light output line 60 are preserved. The measured blue light output line 56 is shown to further diverge from the blue filter line 50 as the wavelength becomes shorter. The green light output line 58 matches the characteristics of the green filter. The red light output line 60 is attenuated somewhat by the LCD layers but, since the red light output is flat, the attenuation by the LCD layers over the red range is not significantly sensitive to wavelength.

Due to the attenuation vs. wavelength characteristics of the LCD layers, the white point(s) of the LCD will not be the same as the white point(s) of the backlight when all the red, green, and blue pixels are turned on at the same time.

The vertical dashed lines 64-68 represent the center wavelengths of five different bins of blue LED dies, determined by either measuring dominant wavelengths or peak wavelengths. As seen from FIG. 3, the LCD attenuates the blue light associated with bin 64 much more than the blue light associated with bin 68. That means that, if the same amount of blue light leaked through a phosphor layer for all the bins of blue LEDs, the observed blue light output by the LCD when illuminated by an LED from bin 64 would be less bright than the blue light output when illuminated by an LED from bin 68. This would cause a blue light output of the LCD to vary over the LCD's surface, since the backlight does not homogeneously mix all the light from the various white light LEDs over the entire output surface of the backlight. For an edge-lit backlight, this is especially true near the edges of the backlight where the LEDs are located and the light has not fully mixed. For a mixing box system where LEDs are distributed directly in back of the LCD, the color non-uniformity would occur over the complete screen close to each LED.

To compensate for the attenuation vs. wavelength characteristics of the LCD layers, the phosphor layer over the blue LEDs is tailored to each blue LED bin to allow more blue light to leak through for the shorter wavelength bins. The red and green light components of the white light provided by the phosphor layer should be substantially unaffected. Thus, white light LEDs formed using short wavelength blue LEDs from bin 64 will look bluer to the human eye, since more blue light leaks through, compared to white light LEDs formed using longer wavelength blue LEDs from bins 65-68. The white light from LEDs formed using blue LED dies from bin 68 will appear to be the least blue of all the other white light LEDs from the bins 64-67.

Adjusting the blue light leakage may be accomplished by changing the phosphor particle density in a binder or making the phosphor layer thinner.

Figure 5:
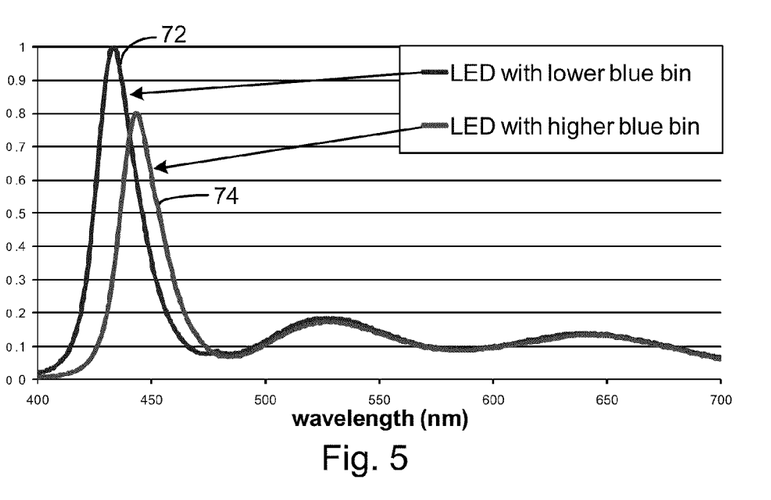
FIG. 5 is a graph of the different output spectral distributions of two different white light LEDs, where the white points are different but the color output of an LCD is the same using either of the LEDs in a backlight.

FIG. 5 is a graph plotting the white light emissions from two different white light LEDs, where the phosphor layer has been tailored to adjust the amount of blue light leakage. The white light has not been passed through an LCD. The curve 72 shows the relative brightness of the emitted light at various wavelengths for a white light LED using a shorter dominant or peak wavelength blue LED. The curve 74 shows the relative brightness of the emitted light at various wavelengths for a white light LED using a longer wavelength blue LED. If these white light LEDs were used to backlight an LCD, the LCD's white point (all pixels on) would be exactly the same for both LEDs, even though the white point of the LED creating curve 72 would appear bluer at the output of the backlight. Note that the green and red light output of the white light LEDs in FIG. 5 are the same, since the phosphor layers on both blue LEDs generate the same green and red light components.

Therefore, by using the present invention, a backlight populated with white light LEDs formed using blue LEDs from different bins would have a non-uniform white point across its surface.

If each backlight were only populated with white light LEDs using blue LEDs all from the same bin, then the white point across the entire backlight will be substantially uniform. The benefit of the invention in that case is that the output color of LCDs will be consistent from one LCD to the other no matter which bin of LEDs was used to populate the backlights.

Figure 6:
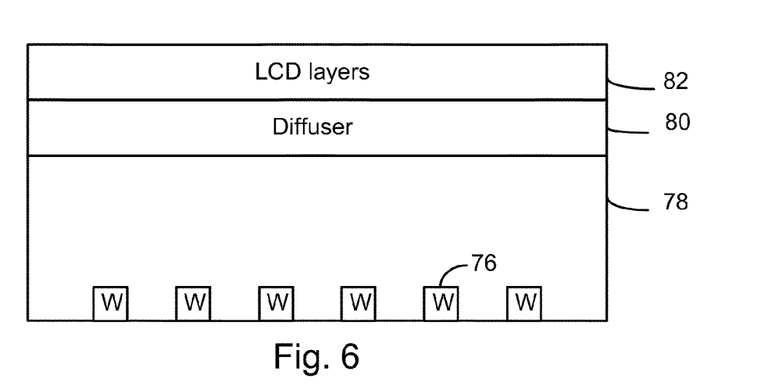
FIG. 6 is a cross-sectional view of an LCD, including LCD layers and a white light LED backlight, where the white light LEDs are arranged in an array directly behind the LCD layers.

FIG. 6 illustrates the compensated white light LEDs 76, such as the LEDs represented in FIG. 5, mounted at the bottom of a reflective backlight mixing box 78. The blue LED dies used to form LEDs 76 are assumed to be from a variety of bins, so the white points of the LEDs 76 will be different. The diffuser 80 additionally mixes the light from the LEDs 76. Although the LED light is mixed somewhat in the backlight (comprised of LEDs 76, box 78, and diffuser 80), the emission from the backlight is still not uniform across the backlight surface due to the different white points from the LEDs 76. However, the color output of the LCD layers 82 will be substantially uniform across the LCD in the blue wavelength range due to the tailoring of the red and green phosphor layer(s). A YAG yellow-green phosphor layer may instead be used, where the phosphor layer is tailored as described above to adjust the amount of blue light leakage. The LCD layers 82 may be the same as those shown in FIG. 1.

Since the backlight materials themselves may attenuate blue wavelengths to different degrees, the blue light attenuation by the backlight materials should also be taken into account when tailoring the phosphor layer.

Figure 7:
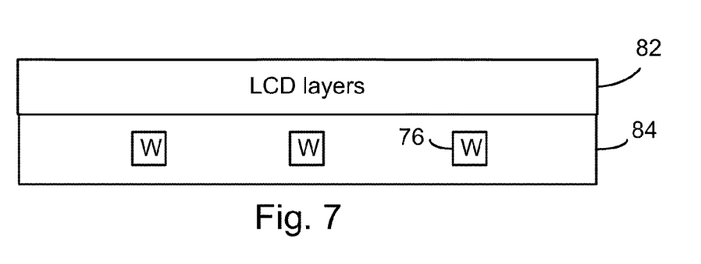
FIG. 7 is a cross-sectional view of an LCD, including LCD layers and a white light LED backlight, where the white light LEDs are coupled to an edge of a lightguide to form a backlight.

FIG. 7 illustrates another type of LCD using a lightguide backlight 84, such as formed of a PMMA material. There may be prisms or roughening on the bottom surface of the backlight to uniformly reflect light upward to illuminate the back surface of the LCD layers 82. As mentioned above, although the LED light is mixed somewhat in the backlight 84, the emission from the backlight 84 is still not uniform across the backlight surface due to the different white points from the LEDs 76, especially at the edges of the backlight near the LEDs 76. However, the color output of the LCD layers 82 will be substantially uniform across the LCD in the blue wavelength range due to the tailoring of the red and green (or YAG) phosphor layer(s). Since the attenuation of blue light by PMMA varies with wavelength, this blue light attenuation characteristic should also be taken into account when tailoring the phosphor layer.

Figure 8A:
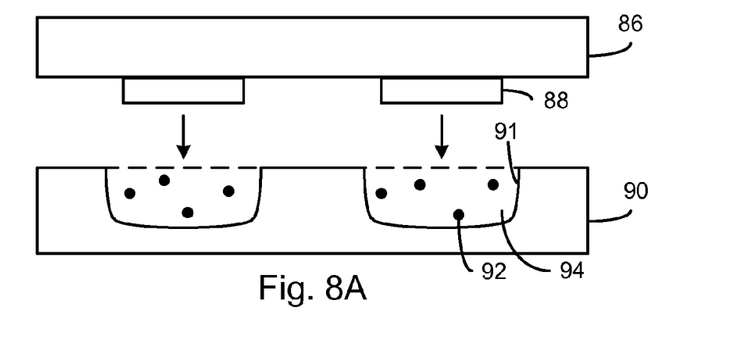
FIGS. 8A-8C illustrate a two-step overmolding process for molding a tailored phosphor layer over a blue LED die, followed by molding a clear lens over the die and phosphor.
Figure 8B:
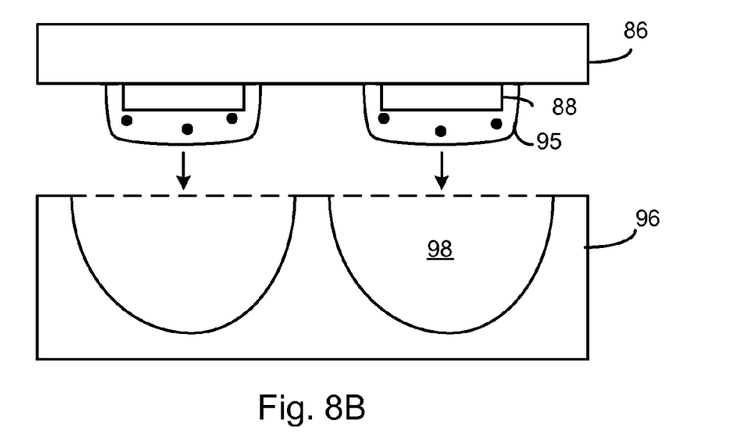
Figure 8C:
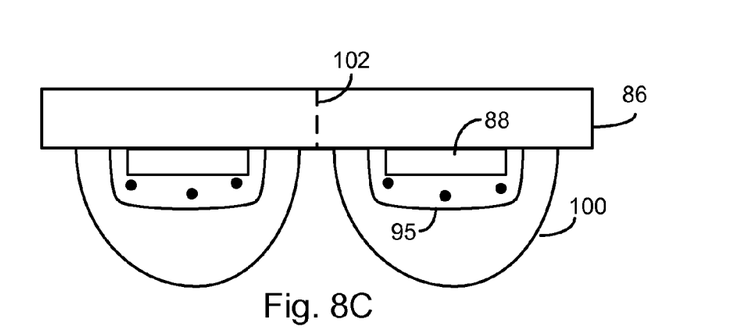

FIGS. 8A-8C illustrate one method for forming a tailored phosphor layer over a blue LED die. In FIG. 8A, a submount wafer 86 has mounted on it an array of blue LED dies 88, preferably from the same bin. There may be over 100 LEDs mounted on the wafer 86. The submount wafer 86 may be ceramic with metal pads/leads bonded to each of the LED dies 88.

A mold 90 has indentations 91 corresponding to the desired shape of the phosphor layer over each LED die 88. The mold 90 is preferably formed of a metal. A very thin non-stick film may be placed over the mold 90 as a release layer, or the mold 90 may have a non-stick surface layer, if needed.

The mold indentions 91 are filled with a heat-curable mixture of red and green phosphor particles 92 in a silicone binder 94. Silicone has a sufficiently high index of refraction (e.g., 1.76) to greatly improve the light extraction from an AlInGaN LED. The density of the phosphor particles 92 and/or the thickness of the phosphor layer are selected to allow the proper amount of blue light to leak through for the particular bin of LED dies used, as previously described.

The wafer 86 and the mold 90 are brought together, and a vacuum seal is created between the periphery of the wafer 86 and the mold 90. Therefore, each LED die 88 is inserted into the phosphor mixture, and the mixture is under compression.

The mold 90 is then heated to about 150 degrees centigrade (or other suitable temperature) for a time to harden the binder material.

The wafer 86 is then separated from the mold 90. The binder material may then be additionally cured by heat or UV light.

In FIG. 8B, a clear silicone lens is then molded over each of the LEDs having a tailored phosphor layer 95. Indentions of a mold 96 are filled with liquid or softened silicone 98, and the wafer 86 and mold 96 are brought together as previously described. The silicone 98 is then cured, and the wafer 86 and mold are separated to produce the structure shown in FIG. 8C, where a clear lens 100 is formed over each of the LED dies and phosphor layers. The submount wafer 86 is then diced (e.g., along the dashed line 102) to separate the white light LEDs. The white light LED submounts may then be mounted on a circuit board, such as shown in FIG. 2, along with other white light LEDs for use in a backlight.

Additional detail on molding phosphor and lenses can be found in U.S. patent publication 20080048200, entitled LED with Phosphor Tile and Overmolded Phosphor in Lens, by Gerd Mueller et al., incorporated herein by reference.

Figure 9A:
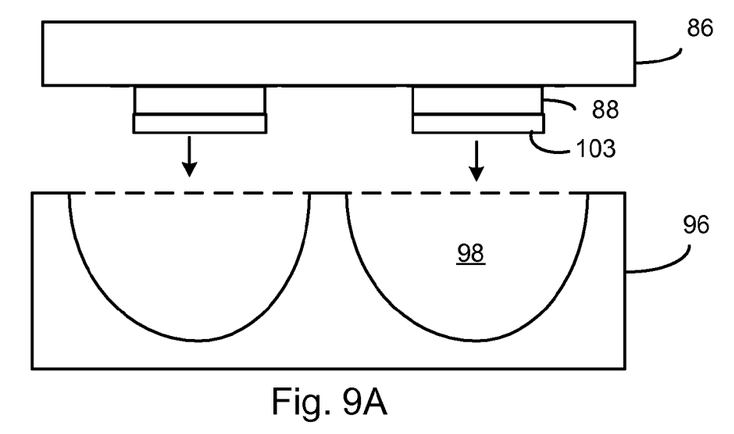
FIGS. 9A and 9B illustrate affixing a tailored phosphor plate over a blue LED die followed by molding a clear lens over the die and phosphor.
Figure 9B:
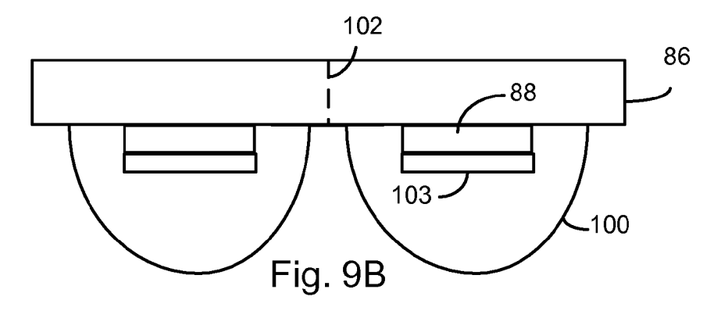

As shown in FIGS. 9A and 9B, instead of molding the phosphor layer, the phosphor layer may be preformed as plates 103 and affixed to the top surface of the LED die 88 using a thin layer of silicone, similar to the structure shown in FIG. 2. The thicknesses of the plates 103 and/or density of the phosphor particles are tailored for each bin of blue LED dies to leak a desired amount of blue light through. One way to form a sheet of ceramic phosphor is to sinter grains of the phosphor powder using heat and pressure. The percentage of the blue LED light passing through the plate is dependent on the density of the phosphor and the thickness of the plate, which can be precisely controlled. Another way to form a thin sheet of phosphor is to form a slurry of phosphor in a thin sheet and then dry the slurry. Forming such ceramic phosphor plates is described in U.S. patent publication 20050269582, entitled Luminescent Ceramic for a Light Emitting Diode, by Gerd Mueller et al., incorporated herein by reference.

A lens is 100 is then molded over the LED die and phosphor plate using the same process described with respect to FIGS. 8B and C.

The clear lens improves light extraction and protects the LED and phosphor.

Figure 10:
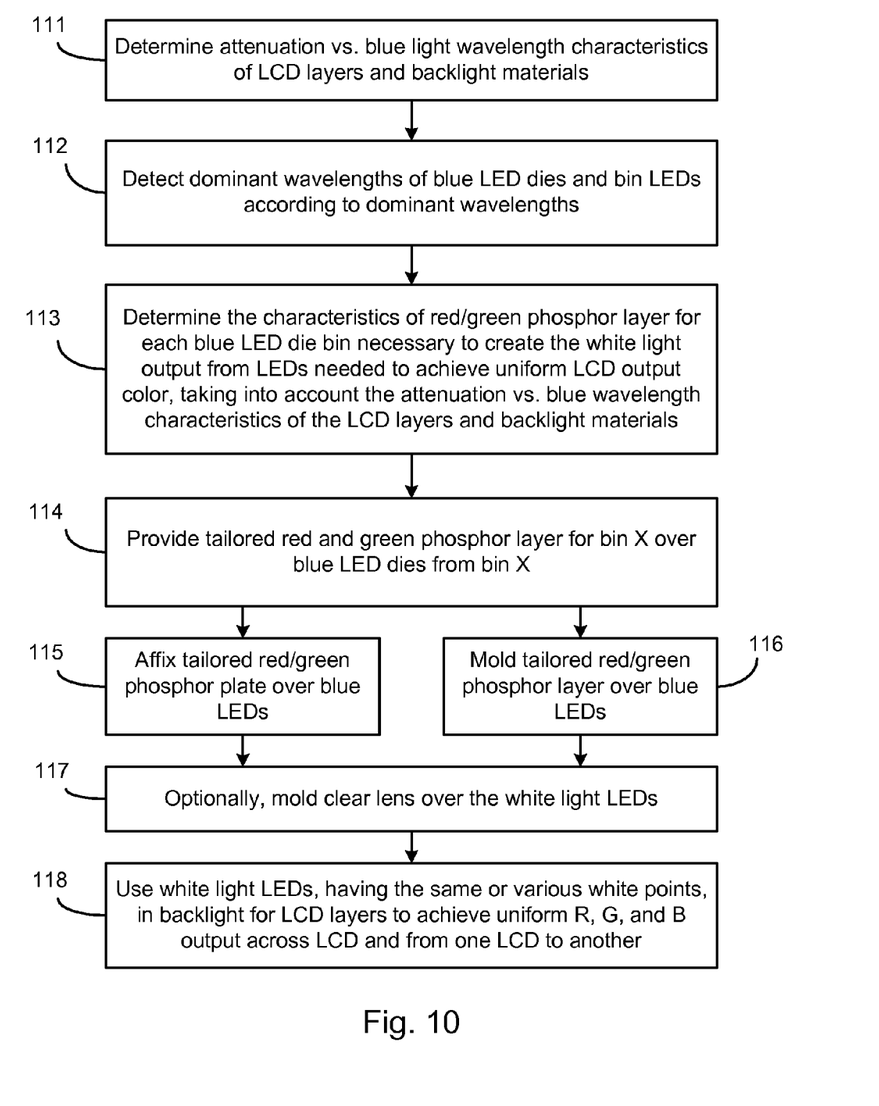
FIG. 10 is a flowchart identifying various steps used to create an LCD using white light LEDs in accordance with one embodiment of the invention.

FIG. 10 is a flowchart showing various steps in one embodiment of the invention.

In step 111, the attenuation vs. blue light wavelength characteristics of the LCD layers and backlight materials in a display system are determined. If there will be negligible attenuation by the backlight, the backlight characteristics can be ignored.

In step 112, the dominant wavelengths of blue LED dies are measured, and the LEDs are binned according to their dominant wavelengths.

In step 113, the necessary characteristics (e.g., density, thickness, ratio) of the red/green phosphor layer over the blue LED dies for each blue LED die bin are determined for creating the white light output from the LEDs needed to achieve uniform LCD output color, taking into account the attenuation vs. blue wavelength characteristics of the LCD layers and backlight materials. This determination may be performed using a simulation algorithm or by empirical methods.

In step 114, the tailored red and green phosphor layer (or YAG layer) associated with a bin is provided over the blue LED dies in that bin. This may be done by affixing a tailored phosphor plate over the LED die (step 115), or molding a tailored phosphor layer over the LED die (step 116), or by some other technique.

In step 117, an optional clear lens is molded over the die and phosphor to improve light extraction and to protect the LED and phosphor.

In step 118, the resulting white light LEDs are used in a backlight for a color LCD to achieve a uniform red, green, and blue output across each LCD and to achieve uniform color from one LCD to another.

Although a typical LCD will attenuate shorter wavelength blue light more than longer wavelength blue light, the invention broadly applies to LCDs that have non-flat blue light wavelength vs. attenuation characteristics.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for forming a liquid crystal display (LCD) system using light emitting diodes (LED) that emit white light, the method comprising:

determining attenuation versus blue light wavelength characteristics of at least LCD layers used to form a color display system, wherein shorter blue wavelength light is attenuated differently than longer blue wavelength light by the LCD layers within a range of visible wavelengths;

measuring dominant or peak wavelengths of blue LED dies;

providing phosphor layers over the blue LED dies, the phosphor layers allowing blue light emitted from the blue LED dies to leak through the phosphor layers, wherein an amount of blue light leakage through a phosphor layer is controlled by adjusting characteristics of the phosphor layers, wherein an amount of blue light leakage through a phosphor layer over a blue LED die corresponds to a dominant or peak wavelength of the blue LED die, and wherein the phosphor layer for a first blue LED die having a first dominant or peak wavelength is tailored to allow more blue light to leak through compared to a phosphor layer for a second blue LED die having a substantially different dominant or peak wavelength in order to at least partially offset the attenuation versus blue light wavelength characteristics of the LCD layers;

wherein light emitted by a combination of blue light leaking through a phosphor layer and light generated by the phosphor layer is white light having a white point at least partially depending on an amount of blue light leaked through the phosphor layer, blue LED dies having associated phosphor layers being white light LEDs; and providing at least one of the white light LEDs as a light source for a backlight to illuminate the LCD layers.

2. The method of claim 1 further comprising coupling the at least one white light LED to the backlight.

3. The method of claim 2 further comprising coupling the backlight to the LCD layers to illuminate the LCD layers.

4. The method of claim 1 wherein providing at least one of the white light LEDs as a light source for the backlight comprises providing a plurality of the white light LEDs as the light source, wherein white light LEDs within the plurality of LEDs provided as the light source for the backlight have different white points.

5. The method of claim 1 wherein the phosphor layers include red and green phosphor particles.

6. The method of claim 1 wherein adjusting characteristics of the phosphor layers comprise adjusting a density of phosphor particles in the phosphor layers, wherein a lower density of phosphor particles allows more blue light to leak through the phosphor layer.

7. The method of claim 1 wherein adjusting characteristics of the phosphor layers comprise adjusting a thickness of the phosphor layers, wherein a thinner phosphor layer allows more blue light to leak through the phosphor layer.

8. The method of claim 1 wherein providing phosphor layers over the blue LED dies comprises molding phosphor layers over the blue LED dies.

9. The method of claim 1 wherein providing phosphor layers over the blue LED dies comprises affixing a phosphor plates over the blue LED dies.

10. The method of claim 1 further comprising:
coupling the at least one white light LED to the backlight;
coupling the backlight to the LCD layers to illuminate the LCD layers; and
energizing the at least one white light LED.

11. A lighting system comprising:
a plurality of white light, light emitting diodes (LEDs), each white light LED comprising an LED die that emits blue light and a phosphor layer over the LED die, wherein light emitted by a combination of blue light leaking through the phosphor layer and light generated by the phosphor layer is white light having a white point at least partially depending on an amount of blue light leaked through the phosphor layer; and
a backlight comprising the white light LEDs and a light mixing device, wherein the backlight is designed for backlighting liquid crystal display (LCD) layers, wherein the LCD layers have non-flat attenuation versus blue light wavelength characteristics, wherein shorter blue wavelength light is attenuated differently from longer blue wavelength light by the LCD layers within a range of visible wavelengths;
wherein an amount of blue light leakage through the phosphor layer over an LED die substantially corresponds to a dominant or peak wavelength of the LED die, wherein the phosphor layer for a first LED die having a first dominant or peak wavelength allows more blue light to leak through compared to a phosphor layer for a second LED die having a substantially different dominant or peak wavelength in order to at least partially offset the attenuation versus blue light wavelength characteristics of the LCD layers.

12. The system of claim 11 further comprising the LCD layers coupled to the backlight.

13. A backlight for a color liquid crystal display (LCD) system formed using the following process:
determining attenuation versus blue light wavelength characteristics of at least LCD layers used to form a color display system, wherein shorter blue wavelength light is attenuated differently than longer blue wavelength light by the LCD layers within a range of visible wavelengths;
measuring dominant or peak wavelengths of blue LED dies;
providing phosphor layers over the blue LED dies, the phosphor layers allowing blue light emitted from the blue LED dies to leak through the phosphor layers, wherein an amount of blue light leakage through a phosphor layer is controlled by adjusting characteristics of the phosphor layers, wherein an amount of blue light leakage through a phosphor layer over a blue LED die corresponds to a dominant or peak wavelength of the blue LED die, and wherein the phosphor layer for a first blue LED die having a first dominant or peak wavelength is tailored to allow more blue light to leak through compared to a phosphor layer for a second blue LED die having a different dominant or peak wavelength in order to at least partially offset the attenuation versus blue light wavelength characteristics of the LCD layers;
wherein light emitted by a combination of blue light leaking through a phosphor layer and light generated by the phosphor layer is white light having a white point at least partially depending on an amount of blue light leaked through the phosphor layer, blue LED dies having associated phosphor layers being white light LEDs; and
coupling a plurality of the white light LEDs to a light mixing device to form a backlight to illuminate the LCD layers.

14. The backlight of claim 13 wherein white light LEDs within the plurality of LEDs coupled to the light mixing device have different white points.

15. The backlight of claim 13 wherein the phosphor layers include red and green phosphor particles.

* * * * *